(12) United States Patent
Crowley et al.

(10) Patent No.: US 9,151,839 B2
(45) Date of Patent: Oct. 6, 2015

(54) IMAGING SYSTEM (75) Inventors: Michael Crowley, Knocknabehy (IE);
Emil Entchev, Ballincolig (IE);
Mohammed Ben Abdillah, Cork (IE)

(73) Assignee: SMITHS DETECTION IRELAND LIMITED, Ballincollig (IE)

( * ) Notice: Subject to any disclaimer, the term of this patent is extended or adjusted under 35 U.S.C. 154(b) by 366 days.

(21) Appl. No.: 13/639,711

(22) PCT Filed: Apr. 11, 2011

(86) PCT No.: PCT/IE2011/000022
§ 371 (c)(1),
(2), (4) Date: Jan. 4, 2013

(87) PCT Pub. No.: WO2011/128882
PCT Pub. Date: Oct. 20, 2011

(65) Prior Publication Data
US 2013/0093611 A1    Apr. 18, 2013

(30) Foreign Application Priority Data
Apr. 15, 2010   (IE) .................................... 2010/0224

(51) Int. Cl.
*G01S 13/88*       (2006.01)
*G01S 7/40*        (2006.01)
(52) U.S. Cl.
CPC ............. *G01S 13/887* (2013.01); *G01S 7/4026* (2013.01); *G01S 2007/403* (2013.01); *G01S 2007/4034* (2013.01)
(58) Field of Classification Search
CPC ................................ G01S 7/4026; G01S 3/42
USPC ............................................................ 342/75
See application file for complete search history.

(56) References Cited

U.S. PATENT DOCUMENTS 6,965,304 B2   11/2005   Yonetani et al.
6,965,340 B1   11/2005   Baharav et al.
(Continued)

FOREIGN PATENT DOCUMENTS

GB      2262009       6/1993
WO    2010001377      1/2010

OTHER PUBLICATIONS

International Search Report and Written Opinion for International Application No. PCT/IE2011/000022, mailed Aug. 1, 2011.

*Primary Examiner* — Timothy A Brainard
(74) *Attorney, Agent, or Firm* — Casimir Jones S.C.

(57) ABSTRACT

An imaging system (1) comprises a transmitter (3, 6), a receiver (3, 4, 6), an antenna array (2); and a controller (4, 5, 10, 11) for directing the transmitter, the receiver, and the antenna array to scan a volume containing an object. The controller has multiple distributed processors (15) to calculate antenna control pattern data during run-time. The processor (4, 5) assesses misalignment of antennae using a receiver placed in the imaging volume, and monitors level of energy received by the receiver and compares it with a reference energy level. Also, the controller performs on-the-fly modification of antenna control pattern data according to real time conditions such as mechanical misalignment of the transmitter, the receiver, or of one or more antennas. The controller may generate three-dimensional offset vectors to provide a profile of the offset across the scan volume, and the position of an antenna may be moved to compensate for the mechanical misalignment.

17 Claims, 4 Drawing Sheets

(56) References Cited

U.S. PATENT DOCUMENTS

| | | |
|---|---|---|
| 6,972,714 B1 | 12/2005 | Baharav et al. |
| 7,112,775 B2 | 9/2006 | Lee et al. |
| 7,224,314 B2 | 5/2007 | Lee et al. |
| 7,280,068 B2 | 10/2007 | Lee et al. |
| 7,283,085 B2 | 10/2007 | Lee et al. |
| 7,298,318 B2 | 11/2007 | Baharav et al. |
| 7,327,304 B2 | 2/2008 | Baharav et al. |
| 7,333,055 B2 | 2/2008 | Baharav et al. |
| 7,525,500 B2 | 4/2009 | Lee |
| 2005/0270220 A1 | 12/2005 | Baharav et al. |
| 2006/0109160 A1 | 5/2006 | Baharav et al. |
| 2006/0214836 A1 | 9/2006 | Baharav et al. |
| 2006/0214838 A1 | 9/2006 | Humphrey |
| 2008/0094296 A1 | 4/2008 | Lee |
| 2008/0094301 A1 | 4/2008 | Lee et al. |
| 2008/0161685 A1 | 7/2008 | Weems et al. |
| 2010/0182199 A1* | 7/2010 | Jeong .......................... 342/374 |

* cited by examiner

IMAGING SYSTEM

The present application is a §371 U.S. National entry of International Patent Application PCT/IE2011/000022, filed Apr. 11, 2011, with is incorporated herein by reference, and which claims priority to Irish Patent Application Serial Number 2010/0224, filed Apr. 15, 2010.

FIELD

This application relates to imaging systems, for example, for security scanning. It can apply to imaging systems which operate over a wide range of wavelengths.

BACKGROUND

In response to security threats in transportation and public spaces, inspection of people for weapons and other types of contraband is becoming common at security checkpoints at, for example, airports, train stations, sporting events, concerts, federal buildings, and other public and private facilities. Systems using non-ionizing radiation, such as terahertz and millimeter wave, for imaging of concealed weapons, contraband or other items of interest are known. Such systems are described in, for example, U.S. Pat. Nos. 6,972,714, 6,965,340, 7,112,775, 7,224,314, 7,283,085, 7,333,055, 7,327,304, 7,280,068, 7,298,318, and 7,525,500 and U.S. Patent Appl. Pub. Nos. 2005-0270220, 2006-0109160, 2006-0214836, 2008-0161685, 2008-0094301, 2008-0094296.

In particular, U.S. Pat. No. 6,965,304 discloses a security inspection system having an array of antenna elements each being programmable with a phase delay to direct a beam of microwave radiation towards a target. The antenna elements may be binary phase-shifted with a non-ideal switching device, or continuous phase-shifted with a variable capacitor. U.S. Pat. No. 7,283,085 describes separate scanning and receiver arrays. U.S. Pat. No. 7,298,318 describes a system in which antenna elements are capable of being programmed with an additional transmission coefficient to receive reflected microwave radiation. US2006/0214838 describes a system in which phase shifts may be altered in order to optimize a parameter. Patterns (115) are stored in a computer readable medium (110).

In some such imaging systems there is electronic control of an array of antennas to focus radiation such as millimeter wave energy on a desired spot and to collect the resultant reflection from this focus point. The focus point can be stepped across a three-dimensional volume in order to provide an image of what is contained in the volume.

In order to step the focus point across the scan volume control information (known as the "pattern") needs to be provided to each of the antennas in the array for each point in the volume. In order to provide good resolution and a good quality image two requirements are a large number of antennas and a small step size. These two requirements in turn create a requirement for a large amount of pattern data.

The three-dimensional step size (i.e. distance between focus points) may for example be 4 mm×4 mm×10 mm. An example scan volume of 1.1 m×2 m×1 m yields 13.75 million focus points for which pattern data must be stored. Using a coarse control mechanism where 1 bit of information is required to be stored for each antenna for each focus point yields a total pattern size of 67 GBytes for a system containing 42336 antennas (1 GByte=1024×1024×1024×8 bits).

In current systems this information is held in the system by including a large amount of distributed non-volatile memory. This non-volatile memory is "loaded" off-line outside the system and placed in the system before start-up or loaded in a setup mode at system start prior to use. The pattern data may for example be stored in Compact Flash memory from which the processor reads the data and writes it to SDRAM buffer memory, and in turn feeds the antenna array from this buffer memory.

Using non-volatile memory in the system places limitations on system operation and calibration options due to the slow access times of this type of memory. The invention is directed towards providing a simpler imaging system architecture, and/or simpler system modification, and/or improved real time response to dynamic commands during operation of the system.

SUMMARY

According to the invention, there is provided an imaging system comprising a radiation transmitter, a radiation receiver, and an antenna array; and a controller. The controller directs the transmitter, the receiver, and the antenna array to scan a volume containing an object. It calculates antenna control pattern data at start-up or during run-time.

In one embodiment, the controller comprises a plurality of distributed antenna control circuits (10, 11), each adopted to calculate antenna control pattern data.

In one embodiment, the controller comprises a digital receiver (4) adapted to receive commands from a host computer (5) and to route said commands to the antenna control circuits.

In one embodiment, each said antenna control circuit comprises a processor for distributed calculation of the antenna control pattern data.

In one embodiment, said processor comprises a field programmable gate array processor or an application-specific integrated circuit.

In one embodiment, the controller is adapted to calculate the pattern data without need for non-volatile memory.

In one embodiment, the controller is adapted to output the pattern data without need for a buffer memory such as SDRAM memory.

In one embodiment, the processor is adapted to assess misalignment of antennae using a receiver placed in the imaging volume, and monitoring level of energy received by the receiver and comparing it with a reference energy level.

In one embodiment, the processor is adapted to assess antenna misalignment using a test object placed in the imaging volume, and monitoring energy received by the system's receivers due to presence of the test object.

In one embodiment, the controller is adapted to perform on-the-fly modification of antenna control pattern data according to real time conditions. In one embodiment, said conditions include mechanical misalignment of the transmitter, the receiver, or of one or more antennas.

Preferably, the controller is adapted to insert, according to real time conditions, an offset value in each of three space dimensions when calculating distances.

In one embodiment, the controller is adapted to insert said offset when determining position of a destination scan volume element.

In one embodiment, the controller is adapted to insert said offset to indicate the relative position of an antenna with respect to the antenna array plane.

In one embodiment, the controller is adapted to insert said offset to indicate the relative position of a transceiver horn with respect to the antenna array plane.

In one embodiment, the controller is adapted to change the shape of the scan volume according to real time conditions, in order to compensate for mechanical misalignment.

In one embodiment, the controller is adapted to generate a plurality of three-dimensional offset vectors to provide a profile of the offset across the scan volume.

In another aspect, the invention provides a computer program product comprising a computer usable medium having a computer readable program code embodied therein, said computer readable program code adapted to be executed to perform operations of the controller of the imaging system of any embodiment set out above.

BRIEF DESCRIPTION OF FIGURES

The following drawings are given by way of example only to illustrate the invention.

DETAILED DESCRIPTION

Overview

The present application provides an apparatus and method for imaging a volume for purposes such as security, in which antennas are controlled by a simpler controller and with improved dynamic response and improved system calibration control.

Unless explicitly stated otherwise, "and" can mean "or," and "or" can mean "and." For example, if a feature is described as having A, B, or C, the feature can have A, B, and C, or any combination of A, B, and C. Similarly, if a feature is described as having A, B, and C, the feature can have only one or two of A, B, or C.

Unless explicitly stated otherwise, "a" and "an" can mean "one or more than one." For example, if a device is described as having a feature X, the device may have one or more of feature X.

Figure 1:
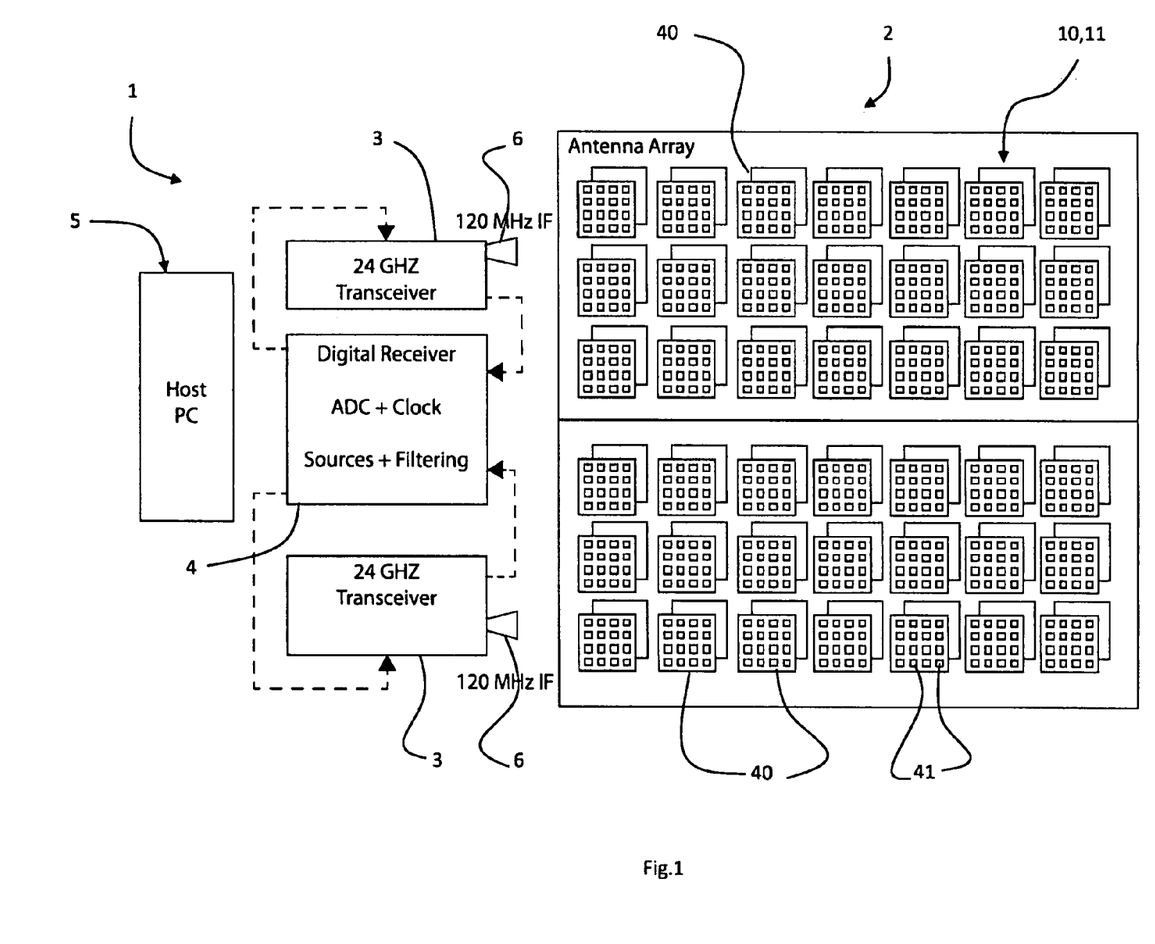
FIG. 1 is a diagram illustrating the main hardware components of an imaging system for driving an antenna array.

Referring to FIG. 1 an imaging system 1 comprises an antenna array 2, 24 GHz transceivers 3, and a digital receiver 4 including an ADC and circuits for filtering. The digital receiver communicates with a host PC 5 which is part of the system, the digital receiver receiving commands from the host PC and passing data to the host PC for display.

The host PC 5 presents a GUI to the operator, initiates volume scans by issuing "scan requests", performs system diagnostics and error reporting, and collects scan data and displays it for the operator. The digital receiver 4 receives the scan requests from the host PC 5 and presents them to the antenna array 2 in a synchronised manner. Also, it receives and processes scan data from the transceivers 3, packetizes it, and passes it to the host PC 5 for processing and display. Each transceiver 3 transmits high-frequency energy from RF horns "at" the antenna array 2, and it collects high-frequency energy from the antenna array 2 (reflected from the target), down-converts it to a lower frequency and passes it to the digital receiver 4 for packetization and processing.

Figure 2:
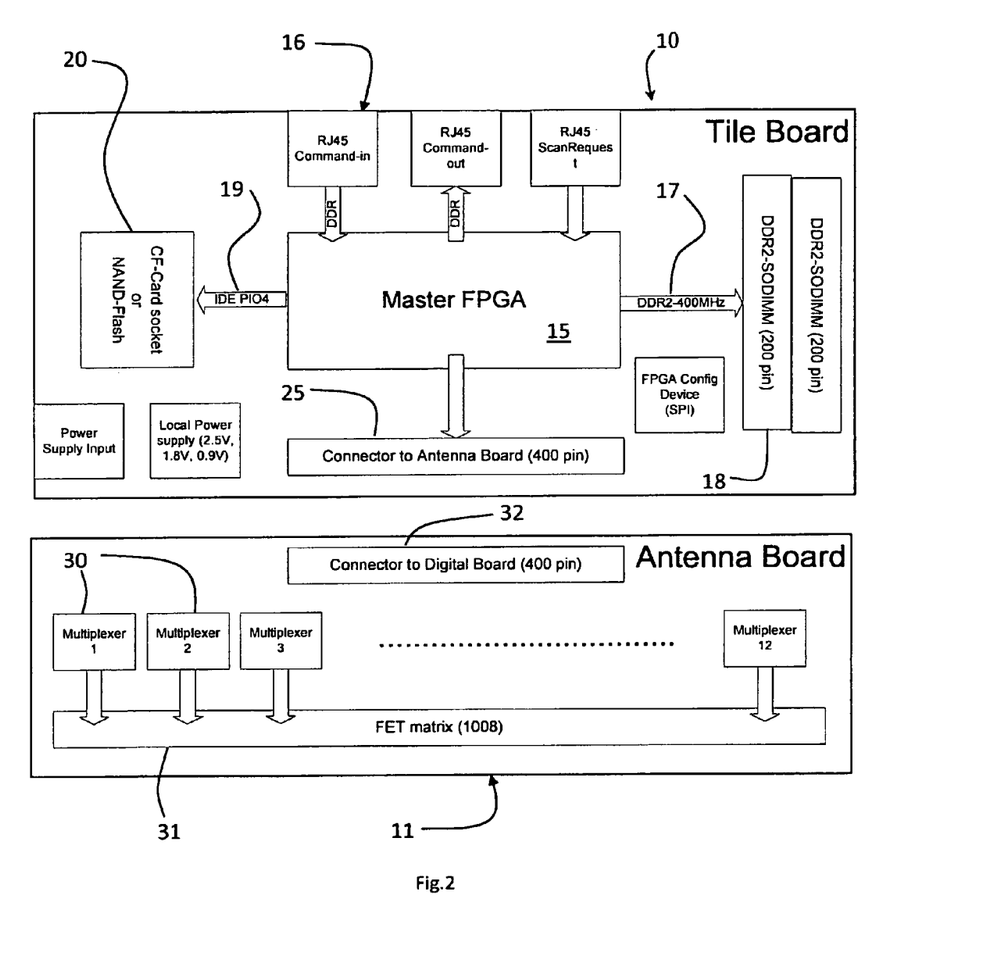
FIG. 2 is a more detailed block diagram illustrating an antenna tile circuit.

Referring to FIG. 2, the antenna array 2 comprises a multiple of "tile" boards 10 each having an antenna board 11 which is inserted in a socket in the digital board 10. A master FPGA 15 is linked with RJ45 interfaces 16 for communication with the digital receiver 4. There is also a DDR2 400 MHz interface 17 to DDR2-SODIMM memory circuits 18, and an IDE PI06 interface 19 to a CF Card socket 20 or NAND Flash. There is a 400-pin connector 25 to the antenna board.

The antenna board 11 comprises twelve multiplexers 30 on an FET matrix 31 with 1008 elements, and communication with the digital tile board 10 is via a 400-pin connector 32.

Taking an example antenna array of 42 tile boards 10 each of which contains 1008 antennas yields a total of 42336 antennas in the array. To focus on a point a decision has to be made on how to phase-shift the high frequency energy at the antenna such that it contributes constructively to the scan. The system 1 has a binary control of the antenna where a single bit decides whether the antenna should phase shift by 180° or not. This means that for each scan point 42336 bits are provided and the pattern for each of the focus points is 42336 bits long.

The scan volume is 1.1 m×2 m×1 m (X*Y*Z). The scan step is (4 mm×4 mm×10 mm). This yields a total number of scan points of 13.75 million. In order to store the patterns for each of these points ~542 Gbits of data would be required or ~67 GBytes for just one scan. In the invention, storage of this pattern data is avoided.

Referring again to FIG. 2 two types of memory are used on each tile (4 GBytes of each type). A non-volatile Compact Flash (CF) card 20 is loaded off-line. The contents of the Flash card are copied to DDR2 SDRAM (five minutes) at start-up for fast access during normal operation.

The calculation of the pattern is performed by the master FPGA 15 and is performed in real time as the system is operating, or at start-up initialization.

The antenna array shown in FIG. 1 can be described as a set of panels 40 each containing a sub-array 41 of antennas and each reflecting energy from multiple of RF energy sources (horns) 6 onto the subject and back to the horns 6.

In order to achieve the highest possible returned power, best signal-to-noise ratio and hence the best image, the image is composed of a weighted average of the data from the panels in regions where two or more panels are scanning simultaneously (known as "overlap" regions). It is important that the antenna panels 40 are focussed on the same point when scanning in these overlap regions and that the RF beams are captured in phase for an optimal weighted combination of data from the panels 40 to occur.

Mechanical misalignment—for example tilting one panel 60 or tilting the whole antenna array 2—can mean that one panel 40 is closer to a particular voxel or to a transceiver horn 6 than was configured when calculating the patterns. Since the distance from the panel 40 to the voxel (and from the panel 40 to the horn 6) is a key component when calculating the pattern this can mean that when combining data the panels will be scanning different points in space. This can cause a blurring or smearing of the image in the overlap regions.

Two methods can be used to determine the mechanical misalignment.

The first method involves using a receiver—for example a quarter-wavelength monopole antenna—to capture the beam from each of the panels separately and to use the beam position as an indication of mechanical misalignment. To do this the following procedure is carried out:

- The receiver is placed at a predefined location in an overlap region.
- The receiver captures the focussed beam from each of the panels 40 separately. A scan is carried out with one panel focussed on the receiver and the other panel(s) "de-focussed". The beam from each panel is captured via the receiver, filtered, and the results are stored.

Figure 3:
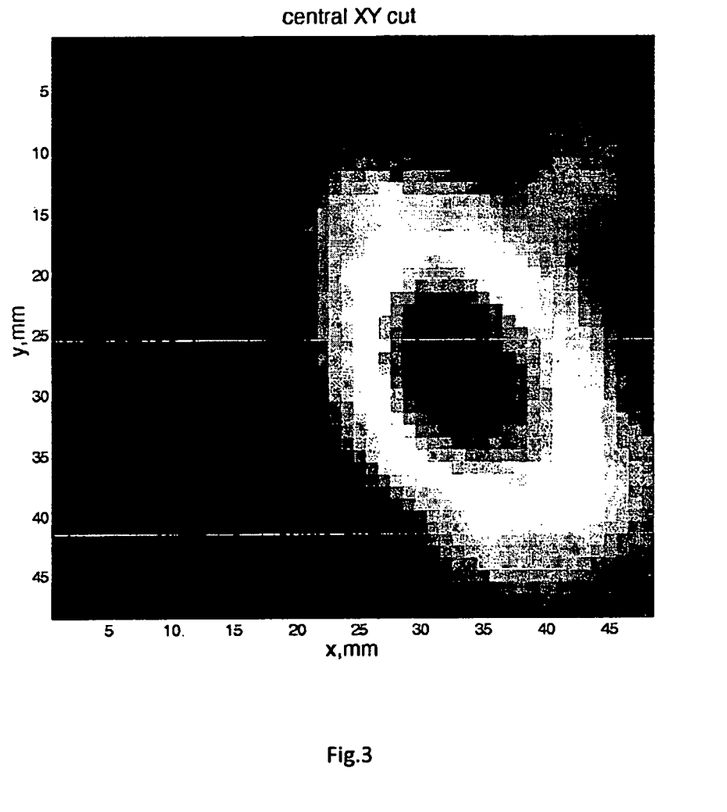
FIG. 3 is an image illustrating an RF beam captured from an antenna panel for the purposes of mechanical alignment assessment.

From the stored results the direction the beam is pointing can be determined by software processing of the data in the host PCT 5. Slices in each dimension are taken and the beam examined to determine whether the beam is off-centre. Examples plots of a data slice in the Z-dimension are shown in FIG. 3. These slices show that the beam is not at the centre of the scan as desired.

The second method involves using a calibration plate/test object either placed in the scan volume or integrated into the machine mechanics. To do this the following procedure is carried out:

A scan is carried out with one panel focussed on the test object and the other panel(s) "de-focussed". The image of the test object for each panel is captured and filtered and the results are stored.

Similar software processing as with the receiver can be used to determine whether the test object is off-centre.

The output of the software data processing is an offset vector of the actual beam centre from the desired beam centre. This offset is provided for all panels. The offset of the beam centre as seen by the receiver or as detected via the test object is essentially an indication of the mechanical imperfections of the system.

It should be noted that multiple receivers and/or multiple calibration plates/test objects can be used to determine a multiple of offset vectors for each panel. In this way a profile of the offsets across the scan volume can be established which in turn allows improved compensation for mechanical misalignment across the scan volume.

In order for the information about misalignment to be useful it is necessary to be able to adjust the patterns quickly such that the user is not delayed in using the scanner. The following describes, with reference to FIG. 4, how the FPGA 15 calculates the pattern on-the-fly:

Two of the most important requirements for the imager 1 are good resolution and a sharp image. In order to achieve these it is necessary to have a large number of antennas (to achieve a large aperture) and an appropriately small step size. This in turn creates a requirement for a large amount of pattern data i.e. a large amount of focus points each with a large amount of control information.

The three-dimensional step size (i.e. distance between focus points) for the imaging scan is 4 mm×4 mm×10 mm. Given a scan volume of 1.1 m×2 m×1 m this means that there are 13.75 million focus points for which pattern data must be stored. Given that there are 42336 antennas in the system and 1 bit of information is required to be stored for each antenna (for the simplest phase quantisation) for each focus point this means that the total amount of pattern data to be stored is 67 GBytes (1 GByte=1024×1024×1024×8 bits) for this single scan.

In the prior art the pattern data was held in the system by including a large amount of distributed non-volatile memory. This non-volatile memory was "loaded" off-line outside the system and placed in the system before start-up. Since non-volatile memory is slow, the data was copied on system start-up to faster volatile memory for use during normal operation.

However due to the large amounts of data it would be impractical to update the slow non-volatile memory in the system after calibration (this would take a number of minutes or hours per calibration step).

To allow for the mechanical misalignment data to be used in-system, distributed programmable logic devices in the system (already in place to allow communication across the antenna array) are used in the system 1 to dynamically calculate the pattern data.

Figure 4:
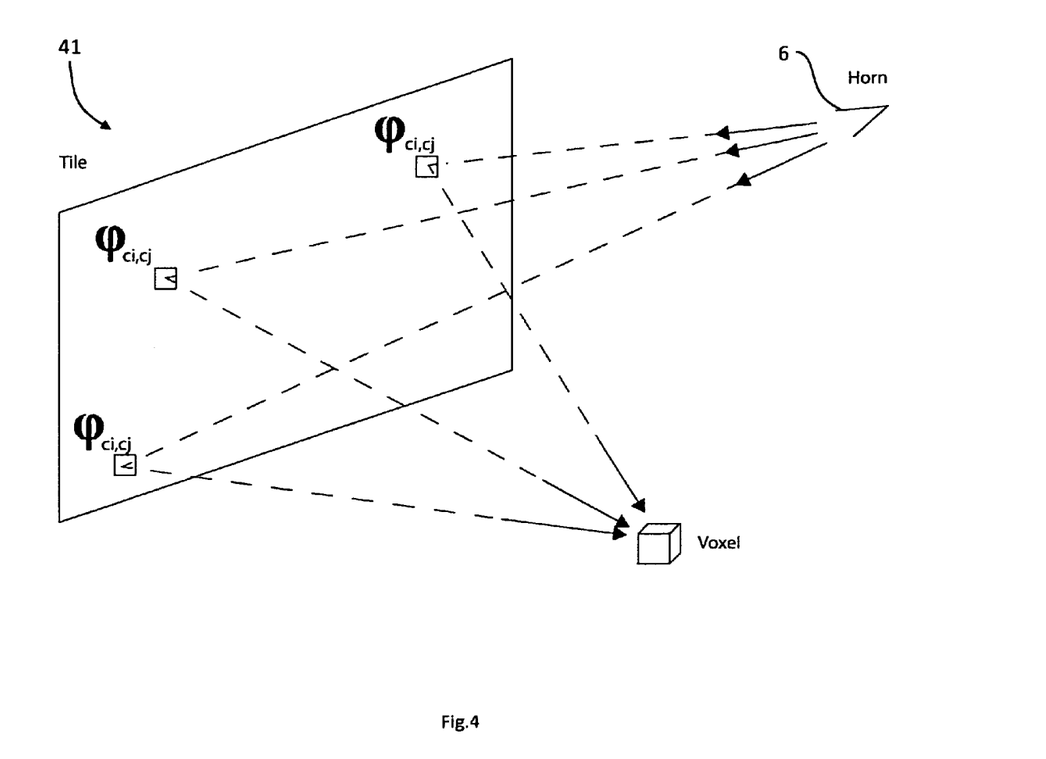
FIG. 4 is a diagram illustrating operation of an antenna and calculation of a pattern for its phase shift.

The transmission path of the RF signal is shown in FIG. 4:

The basic design principle requires that the phase $\phi_{ci,cj}$, of the field reflected from the antenna identified by (ci,cj) in the array, is chosen so the total phase delay from the horn 6 to the voxel (focus point) is constant for all antennas.

The phase $\phi_{ci,cj}$ must satisfy:

$$\mod(k.(ro1_{ci,cj}+ro2_{ci,cj})+\phi_{ci,cj},2\pi)=0 \text{ where,}$$

$ro1_{ci,cj}$ is the distance between the horn and the antenna (ci, cj)

$ro2_{ci,cj}$ is the distance between the voxel and the antenna (ci, cj)

This calculation is performed for each antenna for each point in the scan volume. Instead of attempting to set the delay at each patch antenna to the exact phase shift required for focus, the required phase shift is quantized. The simplest quantization is a binary quantization where the phase shift applied is either 0° or 180°, however more quantization levels could be used providing a greater degree of accuracy in the phase shift across the array. The calculation above becomes much simpler (using binary quantization as an example) and is split into two simple choices:

$$\mod(k.(ro1_{ci,cj}+ro2_{ci,cj}),2\pi)>\pi \rightarrow \text{bit}=0$$

$$\mod(k.(ro1_{ci,cj}+ro2_{ci,cj}),2\pi)\leq\pi \rightarrow \text{bit}=1$$

To break down the distance calculation into some more detail, this is a simple 3-D distance calculation:

$$ro1_{ci,cj} = \sqrt{(X_{horn}-X_{antenna})^2 + (Y_{horn}-Y_{antenna})^2 + (Z_{horn}-Z_{antenna})^2}$$

$$ro2_{ci,cj} = \sqrt{(X_{voxel}-X_{antenna})^2 + (Y_{voxel}-Y_{antenna})^2 + (Z_{voxel}-Z_{antenna})^2}$$

Some options exist here when calculating the pattern for each focus point:
1. The distributed programmable logic blocks are used to calculate the pattern data dynamically and to supply this directly to the antennas. This is the optimum approach as it removes the need for a large amount of volatile memory in the system.
2. The distributed programmable logic blocks could calculate the pattern data at each system start-up and after calibration, and load the pattern data into volatile memory for use in normal operation.

In the first embodiment above the FPGA 15 calculates the pattern data dynamically and supplies this directly to the antennas. This is optimum, as it removes the need for a large amount of both non-volatile memory and volatile memory in the system.

In the second embodiment, the FPGA 15 of each board 10 calculates the control information at each system start-up and loads this information into the volatile memory for use in normal operation. By utilising 42 distributed programmable logic blocks 10 to calculate the required patterns for groups of antennas the 67 GByte calculation required for the imaging scan can be divided into individual 1.76 GByte calculations per programmable logic block. Presuming a clock frequency of 160 MHz these calculations would take 87 seconds if carried out in series. By utilising more logic in the programmable device in parallel (four-fold parallelism) this can be carried out in 22 seconds. With some additional calibration scans to be calculated this brings the calculation time to approximately 30 seconds, which is acceptable.

Pattern Adjustment

The distributed programmable logic circuits 10 can also calculate patterns for adjustment of the mechanical misalignment. The output of the mechanical alignment procedure is a three-dimensional offset vector for all panels.

The offset vector can be utilised in a number of different ways. In the first the distance calculations can be changed as below:

$$ro1_{ci,cj} = \sqrt{\begin{array}{c}(X_{horn} - X_{antenna})^2 + (Y_{horn} - Y_{antenna})^2 + \\ (Z_{horn} - Z_{antenna})^2\end{array}} \text{ (unchanged)}$$

$$ro2_{ci,cj} = \sqrt{\begin{array}{c}(X_{voxel} + X_{offset} - X_{antenna})^2 + \\ (Y_{voxel} + Y_{offset} - Y_{antenna})^2 + \\ (Z_{voxel} + Z_{offset} - Z_{antenna})^2\end{array}}$$

In this case the position of the destination voxel has been artificially adjusted to account for the mechanical offset. In this way the panel can be forced to scan the correct focus point, hence ensuring that when data is combined from all panels the optimum combination will occur.

In a second method the calculations become:

$$ro1_{ci,cj} = \sqrt{\begin{array}{c}(X_{horn} + X_{offset} - X_{antenna})^2 + \\ (Y_{horn} + Y_{offset} - Y_{antenna})^2 + \\ (Z_{horn} + Z_{offset} - Z_{antenna})^2\end{array}}$$

$$ro2_{ci,cj} = \sqrt{\begin{array}{c}(X_{voxel} + X_{offset} - X_{antenna})^2 + \\ (Y_{voxel} + Y_{offset} - Y_{antenna})^2 + \\ (Z_{voxel} + Z_{offset} - Z_{antenna})^2\end{array}}$$

In this case it is the position of the antenna that has been moved to account for the mechanical misalignment. The offset used can be different for each panel, for each tile, or for each antenna depending upon the nature of the mechanical misalignment. In this way each antenna can be forced to scan the correct focus point, hence ensuring that when data is combined from all panels that the optimum combination will occur.

The position of the horns 6 can also be adjusted via the offset to compensate for horn misalignment.

A simple register interface was supplied to allow the software to update the calibration offset vectors as required.

Solutions for mechanical misalignment used in the past have involved mechanical adjustment via precision mechanical components. The advantages of the pattern adjustment approach of the invention are:

Speed: Mechanical adjustments are timely and require tools. Using a purely mathematical/software approach means that the time taken is simply the time to detect the misalignment and recalculate the patterns (approximately 30 seconds).

Automation: An automated approach can be used which reduces the requirements for technician training.

Cost: Precision mechanical components are expensive and can be removed from the system.

Reliability: Using extra precision mechanical components means that there are extra components that can fail.

Scope for compensation: Mechanical components have a finite adjustment range and may not be able to compensate for all situations.

Precision: Greater accuracy and precision can be achieved with computational adjustment.

The invention removes the need for a large amount of non-volatile memory. Instead of using the processing resources of the antenna board 10 to copy the pattern data from non-volatile to volatile memory, it is used instead to calculate the necessary pattern data, thus removing the need for non-volatile memory.

Each distributed pattern calculation block 10 needs two sets of data in order to perform its task:

Information about the scans, such as step size and scan volume. This information can be provided at start-up time by the host PC 5.

The antennas for which it needs to calculate the pattern data. The pattern data is dependent on the position of the antennas. This information can be provided at start-up time by the host PC 5.

It will be appreciated that the invention avoids the need for a large amount of expensive and slow distributed non-volatile memory to supply the pattern data for the antenna array. This reduces system cost due to removal of the non-volatile memory from the system. Also, the start-up time of the machine has been reduced. Copying of control information from the non-volatile to volatile memory takes approximately five minutes, which is followed by some automatic machine calibration routines. Using the firmware to calculate the control patterns reduces this to approximately thirty seconds. Also, in the prior art a large number of different non-volatile memory cards were required for the system, each of which must be separately programmed and labelled before being placed in the system. Using the firmware pattern calculation removes the burden of maintenance and management and also removes a potential source of error in production.

Because in one embodiment the FPGA performs the calculations on-the-fly the system as a whole has major advantages in addition to those outlined above. These arise because when a command is received from the host PC via the digital receiver 4 the FPGA does not need to access the non-volatile Flash memory to retrieve the patterns and then load them to the volatile SDRAM memory. For example, the FPGA can in another embodiment be programmed to perform compensation for tilting of the volume on-the-fly.

The embodiments described above have been set forth herein for the purpose of illustration. This description, however, should not be deemed to be a limitation on the scope of the invention. Various modifications, adaptations, and alternatives may occur to one skilled in the art without departing from the claimed inventive concept. The spirit and scope of the invention are indicated by the following claims.

The invention claimed is:

1. An imaging system comprising:
   (a) a transmitter,
   (b) a receiver,
   (c) an antenna array, and
   (d) a controller for directing the transmitter, the receiver, and the antenna array to scan a volume containing an object;
   wherein the transmitter is adapted to transmit radiation at the antenna array;

wherein the antenna array is adapted to reflect radiation received from the transmitter at the volume containing the object, and to reflect radiation reflected by the object at the receiver;

wherein the receiver is adapted to receive radiation reflected from the antenna array;

wherein the controller is adapted to:
(i) calculate antenna control pattern data at start-up or during run-time,
(ii) assess antenna misalignment, and
(iii) perform on-the-fly modification of antenna control pattern data according to real time conditions; wherein said conditions include mechanical misalignment of the transmitter, or of the receiver, or of one or more antennas.

2. The imaging system as claimed in claim 1, wherein the controller comprises a plurality of distributed antenna control circuits, each adapted to calculate antenna control pattern data.

3. The imaging system as claimed in claim 1, wherein the controller comprises a plurality of distributed antenna control circuits, each adapted to calculate antenna control pattern data; and wherein the controller comprises a digital receiver adapted to receive commands from a host computer and to route said commands to the antenna control circuits.

4. The imaging system as claimed in claim 1, wherein the controller comprises a plurality of distributed antenna control circuits, each adapted to calculate antenna control pattern data wherein each said antenna control circuit comprises a processor for distributed calculation of the antenna control pattern data.

5. The imaging system as claimed in claim 1, wherein the controller comprises a plurality of distributed antenna control circuits, each adapted to calculate antenna control pattern data wherein each said antenna control circuit comprises a processor for distributed calculation of the antenna control pattern data; and wherein said processor comprises a field programmable gate array processor or an application-specific integrated circuit.

6. The imaging system as claimed in claim 1, wherein the controller is adapted to calculate the pattern data without need for non-volatile memory.

7. The imaging system as claimed in claim 1, wherein the controller is adapted to output the pattern data without need for a buffer memory.

8. The imaging system as claimed in claim 1, wherein the controller is adapted to assess misalignment of antennae using a receiver placed in the imaging volume, and to monitor level of energy received by the receiver and compare it with a reference energy level.

9. The imaging system as claimed in claim 1, wherein the controller is adapted to assess antenna misalignment using a test object placed in the imaging volume and monitoring energy received by the receiver due to presence of the test object.

10. The imaging system as claimed in claim 1, wherein the controller is adapted to insert, according to real time conditions, an offset value in each of three space dimensions when calculating distances.

11. The imaging system as claimed in claim 1, wherein the controller is adapted to insert, according to real time conditions, an offset value in each of three space dimensions when calculating distances; and wherein the controller is adapted to insert said offset when determining position of a destination scan volume element.

12. The imaging system as claimed in claim 1, wherein the controller is adapted to insert, according to real time conditions, an offset value in each of three space dimensions when calculating distances; and wherein the controller is adapted to insert said offset to indicate the relative position of an antenna with respect to the antenna array plane.

13. The imaging system as claimed in claim 1, wherein the controller is adapted to insert, according to real time conditions, an offset value in each of three space dimensions when calculating distances; and wherein the controller is adapted to insert said offset to indicate the relative position of a transceiver horn with respect to the antenna array plane.

14. The imaging system as claimed in any of claim 1, wherein the controller is adapted to insert, according to real time conditions, an offset value in each of three space dimensions when calculating distances; and wherein the controller is adapted to change the shape of the scan volume according to real time conditions, in order to compensate for mechanical misalignment.

15. The imaging system as claimed in claim 1, wherein the controller is adapted to insert, according to real time conditions, an offset value in each of three space dimensions when calculating distances; and wherein the controller is adapted to change the shape of the scan volume according to real time conditions, in order to compensate for mechanical misalignment; and wherein the controller is adapted to generate a plurality of three-dimensional offset vectors to provide a profile of the offset across the scan volume.

16. An imaging system comprising:
a transmitter,
a receiver,
an antenna array, and
a controller for directing the transmitter, the receiver, and the antenna array to scan a volume containing an object;
wherein the transmitter is adapted to transmit radiation at the antenna array;
wherein the antenna array is adapted to reflect radiation received from the transmitter at the volume containing the object, and to reflect radiation reflected by the object at the receiver;
wherein the receiver is adapted to receive radiation reflected from the antenna array;
wherein the controller is adapted to:
(i) calculate antenna control pattern data at start-up or during run-time,
(ii) assess antenna misalignment, and
(iii) perform on-the-fly modification of antenna control pattern data according to real time conditions; wherein said conditions include mechanical misalignment of the transmitter, or of the receiver, or of one or more antennas; and
wherein the controller is adapted to assess misalignment of antennae using a receiver placed in the imaging volume, and to monitor level of energy received by the receiver and compare it with a reference energy level.

17. An imaging system comprising:
a transmitter,
a receiver,
an antenna array, and
a controller for directing the transmitter, the receiver, and the antenna array to scan a volume containing an object;
wherein the transmitter is adapted to transmit radiation at the antenna array;
wherein the antenna array is adapted to reflect radiation received from the transmitter at the volume containing the object, and to reflect radiation reflected by the object at the receiver;

wherein the receiver is adapted to receive radiation reflected from the antenna array;

wherein the controller is adapted to:
- (i) calculate antenna control pattern data at start-up or during run-time,
- (ii) assess antenna misalignment; and
- (iii) perform on-the-fly modification of antenna control pattern data according to real time conditions; wherein said conditions include mechanical misalignment of the transmitter, or of the receiver, or of one or more antennas; and wherein the controller is adapted to assess antenna misalignment using a test object placed in the imaging volume and monitoring energy received by the receiver due to presence of the test object.

* * * * *